(12) United States Patent
Price et al.

(10) Patent No.: US 10,430,647 B2
(45) Date of Patent: Oct. 1, 2019

(54) TAILORED ILLUMINATION PROFILE FOR ARTICULATED HAND TRACKING

(71) Applicant: Microsoft Technology Licensing, LLC, Redmond, WA (US)

(72) Inventors: Raymond Kirk Price, Redmond, WA (US); Ravi K. Nalla, San Jose, CA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 304 days.

(21) Appl. No.: 15/406,485

(22) Filed: Jan. 13, 2017

(65) Prior Publication Data

US 2018/0204055 A1 Jul. 19, 2018

(51) Int. Cl.
*G06K 9/00* (2006.01)
*G02B 27/01* (2006.01)
*G06F 3/01* (2006.01)
*H04N 13/211* (2018.01)
*H04N 13/254* (2018.01)
*G06K 9/20* (2006.01)
*H04N 13/271* (2018.01)

(52) U.S. Cl.
CPC ....... *G06K 9/00355* (2013.01); *G02B 27/017* (2013.01); *G06F 3/011* (2013.01); *G06K 9/00201* (2013.01); *G06K 9/209* (2013.01); *G06K 9/2027* (2013.01); *H04N 13/211* (2018.05); *H04N 13/254* (2018.05); *G02B 2027/0138* (2013.01); *G02B 2027/0187* (2013.01); *G06K 9/00375* (2013.01); *G06K 9/2018* (2013.01); *H04N 13/271* (2018.05)

(58) Field of Classification Search
CPC .......................... G06K 9/00355; G02B 27/017
USPC .......................................................... 348/53
See application file for complete search history.

(56) References Cited

U.S. PATENT DOCUMENTS 9,202,313 B2 12/2015 Bennet et al.
9,285,893 B2 3/2016 Holz
(Continued)

OTHER PUBLICATIONS

Colaco, Andrea B., "Compact and Low-Power Computational 3D Sensors for Gestural Input", In Doctoral dissertation of Massachusetts Institute of Technology, Jun. 2014, pp. 1-150.
(Continued)

*Primary Examiner* — Jeffery A Williams
(74) *Attorney, Agent, or Firm* — Arent Fox LLP (57) ABSTRACT

Disclosed are a device and a method of hand tracking based on a tailored illumination profile. In some embodiments, the hand tracking device includes an illumination module, an imaging sensor and a processor. The illumination module provides an illumination profile that matches a predicted interaction volume within which a user of the near-eye display device is expected to place a body part of the user to interact with a user interface of the near-eye display device. The imaging sensor receives light reflected by an environment of the near-eye display device including the body part of the user and generates depth values corresponding to depths of the environment relative to the near-eye display device. The processor tracks a location of the body part of the user based on the depth values and determines an adjustment of an illumination intensity of the illumination module based on the location of the body part of the user.

17 Claims, 9 Drawing Sheets

(56) References Cited

U.S. PATENT DOCUMENTS

| | | | |
|---|---|---|---|
| 9,304,594 B2 | 4/2016 | Finocchio et al. | |
| 2013/0335303 A1* | 12/2013 | Maciocci | G06F 3/011 345/8 |
| 2013/0335546 A1* | 12/2013 | Crane | G06F 3/013 348/78 |
| 2014/0361956 A1 | 12/2014 | Mikhailov et al. | |
| 2014/0376773 A1 | 12/2014 | Holz | |
| 2015/0022447 A1 | 1/2015 | Hare et al. | |
| 2015/0054734 A1 | 2/2015 | Raghoebardajal et al. | |
| 2015/0103004 A1 | 4/2015 | Cohen et al. | |
| 2015/0226553 A1 | 8/2015 | Fuchikami et al. | |
| 2015/0261318 A1 | 9/2015 | Scavezze et al. | |
| 2015/0300816 A1 | 10/2015 | Yang et al. | |
| 2016/0253821 A1* | 9/2016 | Romano | G06F 3/017 382/103 |
| 2018/0033146 A1* | 2/2018 | Bleyer | G01B 11/2513 |

OTHER PUBLICATIONS

Carbotte, Kevin, "Hand Tracking In VR: Leap Motion Hands-On", Published on: Jun. 29, 2015 Available at: http://www.tomshardware.com/news/leap-motion-vr-hands-on,29438.html.
Banerjee, et al., "Human Motion Detection and Tracking for Video Surveillance", In Proceedings of the national Conference of Communications, Apr. 2008, 5 pages.

\* cited by examiner

TAILORED ILLUMINATION PROFILE FOR ARTICULATED HAND TRACKING

BACKGROUND

Depth sensing technology can be used to determine a person's location in relation to nearby objects or to generate an image of a person's immediate environment in three dimensions (3D). One application in which depth sensing technology may be used is in head-mounted display (HMD) devices and other types of near-eye display (NED) devices. Depth sensing technology can employ a time-of-flight (ToF) depth camera. With ToF based depth sensing technology, a light source emits light onto nearby objects, and a ToF camera captures the light after it reflects off surfaces of the objects. The time taken for the light to travel from the light source and to reflect back from an object to the ToF camera is converted, based on the known speed of light, into a depth measurement (i.e., the distance to the object). Such a measurement can be processed with other similar measurements to create a map of physical surfaces in the user's environment (called a depth image or depth map) and, if desired, to render a 3D image of the user's environment.

SUMMARY

Introduced here are a device and a method (collectively and individually, "the technique introduced here") of tracking a user's certain body part (e.g., hands). In some embodiments, the tracking device includes an illumination module, an imaging sensor and a processor. The illumination module provides an illumination profile that matches an interaction volume within which a user of the near-eye display device places a body part of the user to interact with a user interface of the near-eye display device. The imaging sensor receives light reflected by an environment of the near-eye display device including the body part of the user and generates depth values corresponding to depths of the environment relative to the near-eye display device. The processor tracks a location of the body part of the user based on the depth values and determines an adjustment of an illumination intensity of the illumination module based on the location of the body part of the user.

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device according to the disclosed embodiments can potentially be used by a user that is not human, such as a machine or an animal. Hence, the term "user" can refer to any of those possibilities, except as may be otherwise stated or evident from the context. Further, the term "body part" is used here as a general term to refer to a human body part, an animal body pat, or a machine-implemented part. The term "hand tracking" (or "body part tracking") is used henceforth in this description as a general term to refer to a process of tracking movement or position of a body part such as a human hand, an animal body part or a machine-implemented part.

Some display devices such HMD devices and other types of NED devices use hand tracking as an input mechanism for users to interact with user interfaces provided by the display devices. Such display devices (also referred to as hand tracking devices) include one or more illumination modules (e.g., laser diodes) to provide illumination to user's hands for hand tracking purpose. However, a portion of the light provided by the illumination modules reaches regions where the user is unlikely to place his hands. In other words, some of the power consumed by the illumination modules does not contribute to the illumination for hand tracking and therefore is wasted. Reducing unnecessary power consumption is often an important concern for any portable device, such as an HMD device.

Therefore, to optimize the illumination efficiency and thereby reduce unnecessary power consumption, in accordance with at least some embodiments introduced here, the illumination modules of an HMD device that performs hand tracking are designed such that the illumination profile matches the optical losses of the image sensing system. As a result, the active illumination performance of the imaging system matches the motion range where user's hands are most likely to be during the user's interaction with the hand tracking device (such a motion range is referred to as "predicted interaction volume" or simply "interaction volume"). The illumination profile further can be optimized to compensate for the optical loss of the device due to a wide field of view of the imaging lens (e.g., 120 degrees of horizontal field of view).

The illumination profile depends on the specifications of one or more optical components of the illumination module. In some embodiments, for example, the illumination module can include one or more light sources. For example, the illumination module can include a laser diode or a light-emitting diode (LED) as the light source. Alternatively, the illumination module can include an array of laser diodes or LEDs.

The illumination can further include other optical components such as an optical collimator and an optical diffuser for achieving the targeted illumination profile. The optical collimator narrows the light emitted from the light source; in other words, the optical collimator causes the directions of the light to become less divergent in a specific direction. The optical diffuser is designed to have a specific shape so that the optical diffuser diffuses (spreads out) the collimated light in a way that conforms to the illumination profile.

In some alternative embodiments, the illumination profile can be tailored in other ways. For example, the illumination profile can be tailored dynamically by phase-controlling the light source(s), or tailored dynamically by changing the light paths via constructive or destructive interference. In some embodiments, a single mode laser with associated diffractive optical element can also be used to achieve the desired illumination profile. Alternatively, the illumination module can include mechanical components to change locations, orientations or shapes of the optical components (e.g., collimator or diffuser) to tailor the illumination profile. The illumination module can also adjust the illumination profile by controlling each individual light source of an array of light sources. In some embodiments, the illumination profile can be tailored dynamically to each individual user. For example, the device can analyze the user's hand locations when the user interacts with the device. The real-time information of the user's hand locations is used to update the interaction volume. Thus, the illumination profile can be adjusted to the updated interaction volume that fits the individual user.

FIGS. 1 through 8 and related text describe certain embodiments of a technology for hand tracking. However, the disclosed embodiments are not limited to NED systems or HMD devices and have a variety of possible applications, such as in computer monitor systems, head-up display (HUD) systems, self-driving automobile systems, and video game systems. All such applications, improvements, or modifications are considered within the scope of the concepts disclosed here.

Illumination Profile Matching Interaction Volume

Figure 1A:
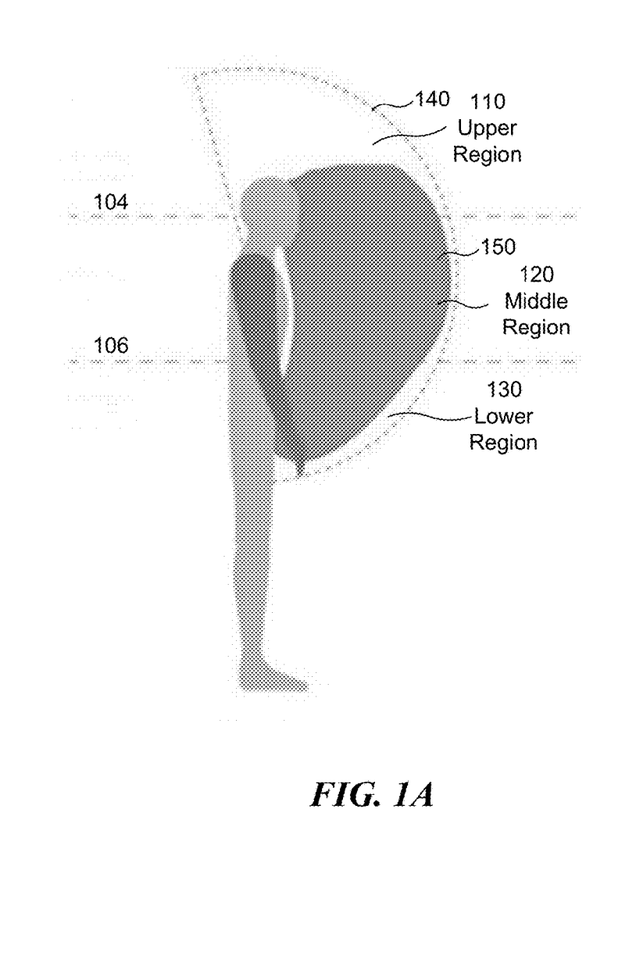
FIG. 1A shows a side view of an interaction volume for a user who wears a head-mounted display device (hereinafter "HMD device") while the user is standing.

FIG. 1A shows a side view of an interaction volume for a user who wears an HMD device while standing up. As illustrated in FIG. 1A, the user has a range of arm motion 140. The range of arm motion 140 represents a space where the user's arms can reach by only moving and rotating his shoulders and arms without moving the rest of his body. The vertical cross section of the range of arm motion 140 is approximately a semi-circle that has a center at the user's shoulders. The radius of the semi-circle equals the length of the user's arms. The range of arm motion 140 can be divided into three regions: upper region 110, middle region 120 and lower region 130. A first horizontal plane 104 across the user' head separates the upper region 110 from the middle region 120. A second horizontal plane 106 across the user's waist separates middle region 120 from the lower region 130.

Although the user's arms are able to reach any point in the region of arm motion 140, the user's arms and hands typically only reach a portion of the region of arm motion 140 when the user interacts with the HMD device worn by the user. FIG. 1A shows an interaction volume 150, which represents the space where the user's arms and hands are expected to reach during the user interaction with the HMD device. The interaction volume 150 is a subset of the region of arm motion 140 and is a region outside of which the user is unlikely to place his hands while intending to interact by hand gesture with the user interface of HMD device.

Although the user is able to raise his arms above his user head (as indicated by the region of arm motion 140), the user's arms and hands rarely reach a point high above his head when he interacts with the HMD device using his arms and hands. Typically during the user interaction with the HMD device, the motion range (i.e., the interaction volume 150) is consistent with a field of view of the user. FIG. 10 shows a typical vertical field of view for a user. In the scenario of FIG. 10, the user's vertical field of view is between an angle of 18 degrees above the horizon and an angle of 85 degrees below the horizon (assuming the user's head-pointing vector is parallel to the horizon). During the user interaction, the user moves the hands within that field of view as illustrated in FIG. 10. As a result, the interaction volume 150 in FIG. 1A is also between an angle of 18 degrees above the horizon and an angle of 85 degrees below the horizon.

Thus, the space of the interaction volume 150 within the region of arm motion 140 is asymmetric, as illustrated in FIG. 1A. The interaction volume 150 includes most of the middle region 120 and the lower region 130. However, the interaction volume 150 includes only a small portion of the upper region 110. Knowledge of the typical or expected interaction volume, such as interaction volume 150, can be used to design an illumination module for hand tracking with improved illumination efficiency.

In some embodiments, the interaction volume can be determined based on motion data collected from users of the HMD device. When a user wearing the HMD device performs gestures using hands and arms, the HMD device records the gesture data (using, e.g., the depth sensing technology). The gesture data can include, e.g., the positions of the hands and/or the arms relative to the HMD device, a recognized type of gesture performed by the user, and information regarding whether the gesture was successfully or unsuccessfully executed. The gesture data can further include the camera frames associated with the gesture. The HMD device transmits the gesture data (also referred to as telemetry data) to a server for analysis. The server collects the telemetry data and determines an interaction volume based on the telemetry data. In some embodiments, the interaction volume is based on telemetry data of multiple users. In some other embodiments, the interaction volume is based on telemetry data of one user.

The HMD device includes one or more illumination modules to emit light onto nearby objects including the user's arms and hands. In some embodiments, the HMD device includes a single illumination module having a predetermined illumination profile, which depends on the specifications of one or more optical components of the illumination module.

The illumination profile of the illumination module (or modules) is designed to provide uniform depth camera performance over a wide field of view of where the user's hands may be located. To optimize the illumination efficiency, the illumination profile of the illumination module is tailored to match the interaction volume 150. In order words, the effective range of the illumination (also referred to as "illumination range") at a particular direction depends on the possible hand location at the particular direction. For example, the user may put the hands down below the waist during the user interaction with the HMD device. At that moment, the arms are extended. Thus, the illumination range towards the hands needs to be extended.

In contrast, when the user moves hands directly in front of the user during the user interaction with the HMD device, the arms are bent. This is due to a fatigue factor. Even though the user's arms are able to reach out straight in front of the user, typically the user does not maintain the straight arms for too long because the arms can fatigue quickly in that pose. The user tends to gesture closer to the body with the bent arms. Thus, the illumination range in this case can be relatively shorter because the hands are closer to the body and the illumination module. To match the illumination profile with the interaction volume, the illumination module can provide a relatively higher illumination power in directions of the middle region 120 and a relatively lower illumination power in directions of the lower region 130.

As a result, the illumination profile of the illumination module is optimized so that the illumination power is not wasted on spatial regions where the user's hands are not likely to be when the user is intending to interact by hand gesture with the HMD device. In other words, the illumination profile is designed to take into account the human factors of the user (e.g., the interaction volume). Such an efficient illumination profile simplifies the design of the illumination module, since the illumination module does not need to provide illumination to points in space far away from the illumination module where the hands do not reach or are unlikely to be placed.

Figure 1B:
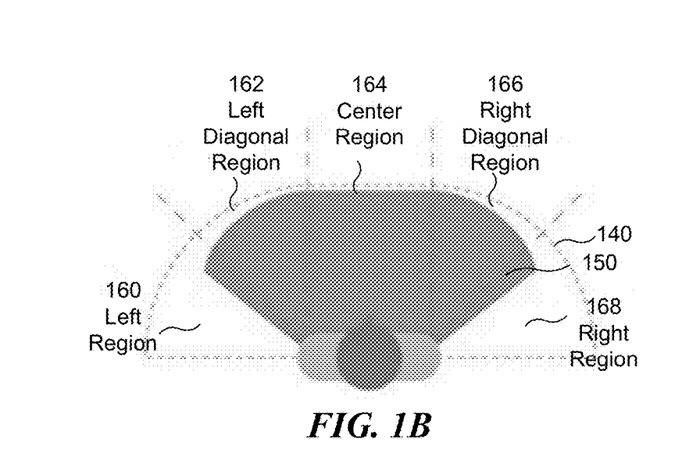
FIG. 1B shows a top view of the interaction volume for the user.
Figure 1C:
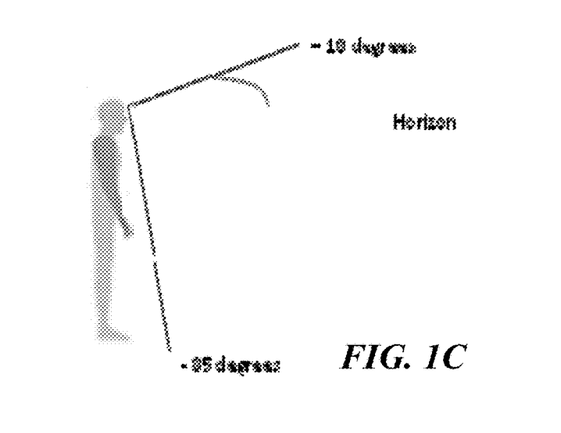
FIG. 1C shows a vertical field of view of a human.

FIG. 1B shows a top view of the interaction volume for the user. The range of arm motion 140 is divided into 5 regions by four vertical planes as illustrated in FIG. 1B. The regions are left region 160, left diagonal region 162, center region 164, right diagonal region 166 and right region 168. During the user interaction with the HMD device, the arms and hands of the user rarely reach the left region 160 and the right region 168. Thus, the interaction volume 150 includes only a small portion of each of the left region 160 and the right region 168. The interaction volume 150 includes most of the left diagonal region 162, the center region 164, and the right diagonal region 166. Again the illumination profile is tailored to match the interaction volume 150. As a result, the illumination module does not need to provide much illumination power at directions of the left region 160 and the right region 168.

Figure 2A:
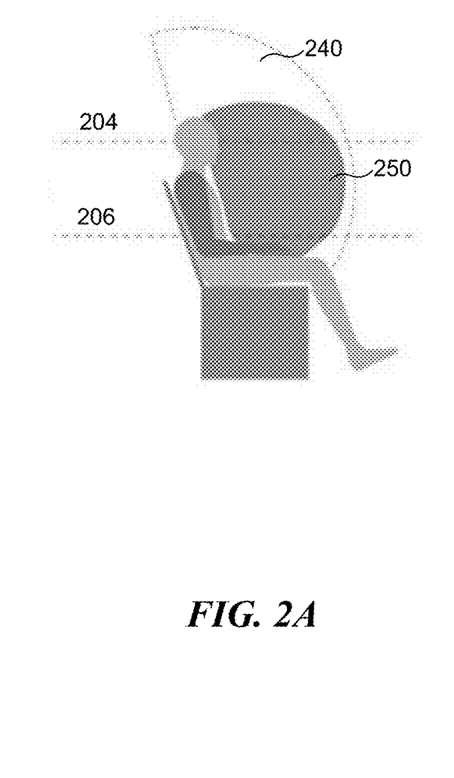
FIG. 2A illustrates an interaction volume for a user who is sitting upright.
Figure 2B:
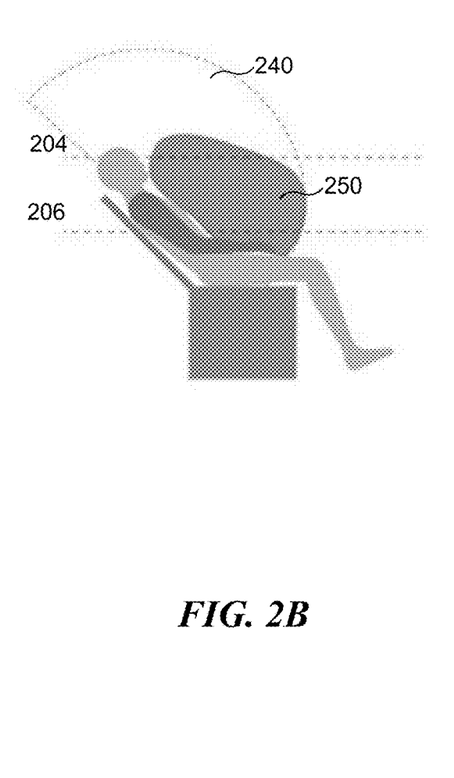
FIG. 2B illustrates an interaction volume for a user who is sitting reclined.
Figure 2C:
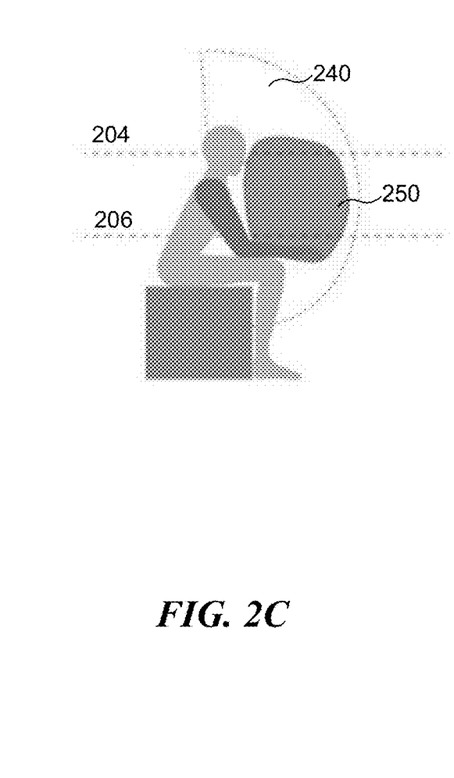
FIG. 2C illustrates an interaction volume for a user who is sitting leaning forward.

Similar to the interaction volume 150 for the user who is standing as illustrated in FIGS. 1A and 1B, the interaction volumes for users who are sitting also can be asymmetric. FIGS. 2A, 2B and 2C illustrate interaction volumes for users having different sitting positions who wear HMD devices. The user in FIG. 2A is sitting upright. The user in FIG. 2B is sitting reclined. The user in FIG. 2C is sitting leaning forward. The range of arm motion 240 for each user of FIGS. 2A, 2B and 2C is divided by two horizontal planes 204 and 206 into three regions: upper region, middle region and lower region. The first horizontal plane 204 extends across the user's hand, and the second horizontal plane 206 extends across the user's waist.

The sitting user's arms and hands rarely reach a point high above the user head when the user interacts with the HMD device. Thus, similar to the interaction volume 150 for the user who is standing, the interaction volume 250 for the sitting users of FIGS. 2A, 2B and 2C only occupies a small portion of the upper region of the region of arm motion 240. The sitting users often place their hands in front of the bodies during the user interaction with the HMD devices. Thus, the interaction volume 250 for the sitting users includes most of the middle region of the range of arm motion 240.

When the users are sitting, the users' hands rarely reach any point below the waist due to the locations of the thighs. As a result, the interaction volume 250 for the sitting users includes only a small portion of the lower region of the range of arm motion 240, as illustrated in FIGS. 2A, 2B and 2C. Similar to the interaction volume 150 for standing users, the illumination profile can be tailored to match the interaction volume 250 for sitting users.

HMD Device Hardware

Figure 3:
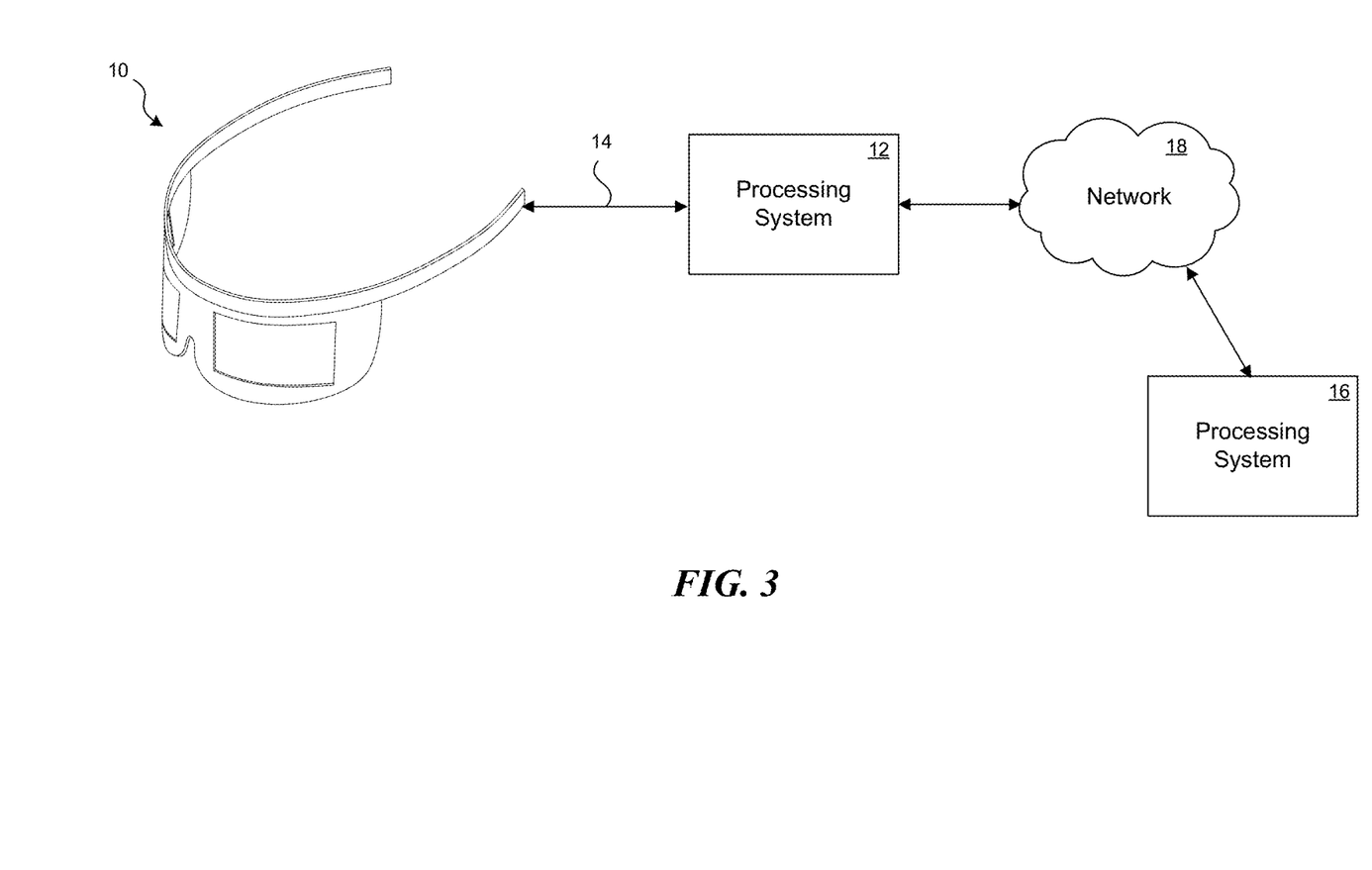
FIG. 3 shows an example of an environment in which a virtual reality (VR) or augmented reality (AR) enabled HMD device can be used.

FIG. 3 schematically shows an example of an environment in which an HMD device can be used. In the illustrated example, the HMD device 10 is configured to communicate data to and from an external processing system 12 through a connection 14, which can be a wired connection, a wireless connection, or a combination thereof. In other use cases, however, the HMD device 10 may operate as a standalone device. The connection 14 can be configured to carry any kind of data, such as image data (e.g., still images and/or full-motion video, including 2D and 3D images), audio, multimedia, voice, and/or any other type(s) of data. The processing system 12 may be, for example, a game console, personal computer, tablet computer, smartphone, or other type of processing device. The connection 14 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 12 may communicate with one or more other processing systems 16 via a network 18, which may be or include, for example, a local area network (LAN), a wide area network (WAN), an intranet, a metropolitan area network (MAN), the global Internet, or combinations thereof.

Figure 4:
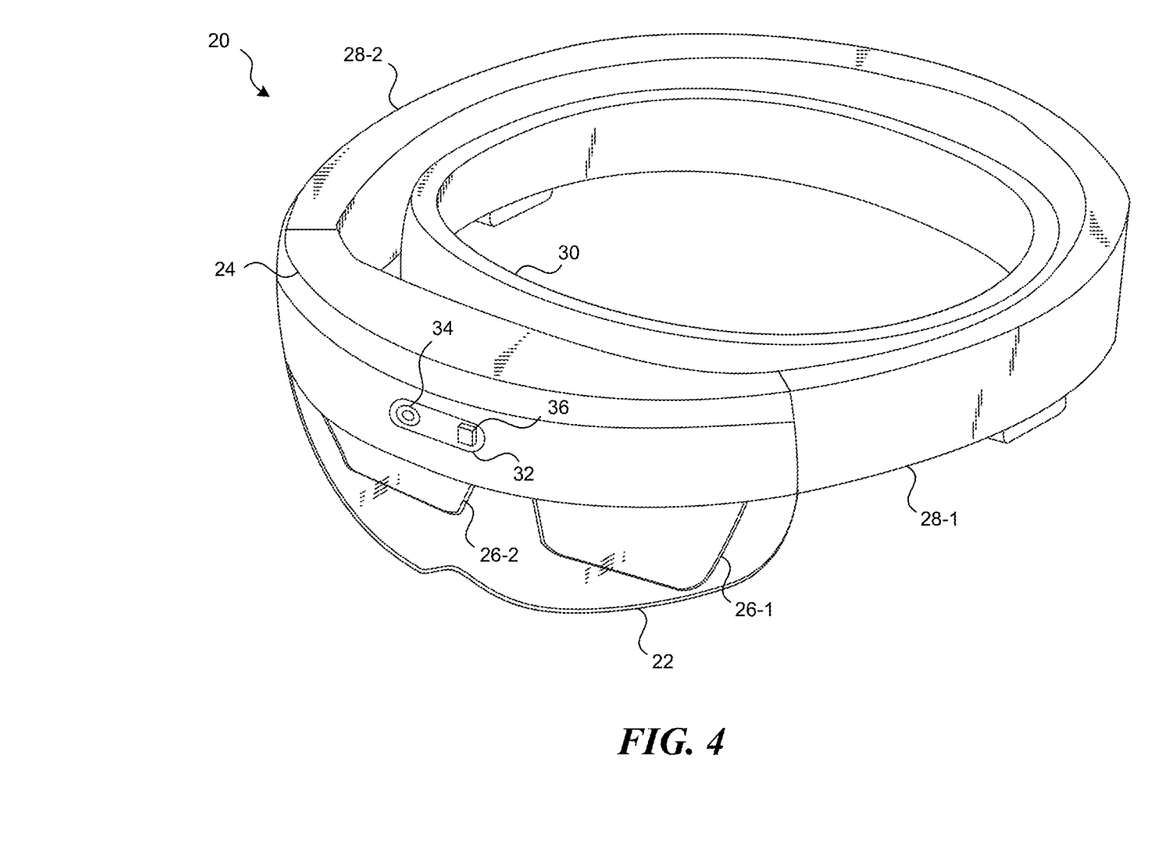
FIG. 4 illustrates a perspective view of an example of an HMD device.

FIG. 4 shows a perspective view of an HMD device 20 that can incorporate the features being introduced here, according to certain embodiments. The HMD device 20 can be an embodiment of the HMD device 10 of FIG. 3. The HMD device 20 has a protective sealed visor assembly 22 (hereafter the "visor assembly 22") that includes a chassis 24. The chassis 24 is the structural component by which display elements, optics, sensors and electronics are coupled to the rest of the HMD device 20. The chassis 24 can be formed of molded plastic, lightweight metal alloy, or polymer, for example.

The visor assembly 22 includes left and right AR displays 26-1 and 26-2, respectively. The AR displays 26-1 and 26-2 are configured to display images overlaid on the user's view of the real-world environment, for example, by projecting light into the user's eyes. Left and right side arms 28-1 and 28-2, respectively, are structures that attach to the chassis 24 at the left and right open ends of the chassis 24, respectively, via flexible or rigid fastening mechanisms (including one or more clamps, hinges, etc.). The HMD device 20 includes an adjustable headband (or other type of head fitting) 30, attached to the side arms 28-1 and 28-2, by which the HMD device 20 can be worn on the user's head.

The chassis 24 may include various fixtures (e.g., screw holes, raised flat surfaces, etc.) to which a sensor assembly 32 and other components can be attached. In some embodiments the sensor assembly 32 is contained within the visor assembly 22 and mounted to an interior surface of the chassis 24 via a lightweight metal frame (not shown). A circuit board (not shown in FIG. 4) bearing electronics components of the HMD 20 (e.g., microprocessor, memory) can also be mounted to the chassis 24 within the visor assembly 22.

The sensor assembly 32 includes a depth camera 34 and an illumination module 36 of a depth imaging system. The illumination module 36 emits light to illuminate a scene. Some of the light reflects off surfaces of objects in the scene, and returns back to the imaging camera 34. In some embodiments such as an active stereo system, the assembly can include two or more cameras. In some embodiments, the illumination modules 36 and the depth cameras 34 can be separate units that are connected by a flexible printed circuit or other data communication interfaces. The depth camera 34 captures the reflected light that includes at least a portion of the light from the illumination module 36.

The "light" emitted from the illumination module 36 is electromagnetic radiation suitable for depth sensing and should not directly interfere with the user's view of the real world. As such, the light emitted from the illumination module 36 is typically not part of the human-visible spectrum. Examples of the emitted light include infrared (IR) light to make the illumination unobtrusive. Sources of the light emitted by the illumination module 36 may include LEDs such as super-luminescent LEDs, laser diodes, or any other semiconductor-based light source with sufficient power output.

The depth camera 34 may be or include any image sensor configured to capture light emitted by an illumination module 36. The depth camera 34 may include a lens that gathers reflected light and images the environment onto the image sensor. An optical bandpass filter may be used to pass only the light with the same wavelength as the light emitted by the illumination module 36. For example, in a structured light depth imaging system, each pixel of the depth camera 34 may use triangulation to determine the distance to objects in the scene. Any of various approaches known to persons skilled in the art can be used for making the corresponding depth calculations.

The HMD device 20 includes electronics circuitry (not shown in FIG. 4) to control the operations of the depth camera 34 and the illumination module 36, and to perform associated data processing functions. The circuitry may include, for example, one or more processors and one or more memories. As a result, the HMD device 20 can provide surface reconstruction to model the user's environment, or can be used as a sensor to receive human interaction information. With such a configuration, images generated by the HMD device 20 can be properly overlaid on the user's 3D view of the real world to provide a so-called augmented reality. Note that in other embodiments the aforementioned components may be located in different locations on the HMD device 20. Additionally, some embodiments may omit some of the aforementioned components and/or may include additional components not discussed above nor shown in FIG. 4. In some alternative embodiments, the aforementioned depth imaging system can be included in devices that are not HMD devices. For example, depth imaging systems can be used in motion sensing input devices for computers or game consoles, automotive sensing devices, earth topography detectors, robots, etc.

Figure 5:
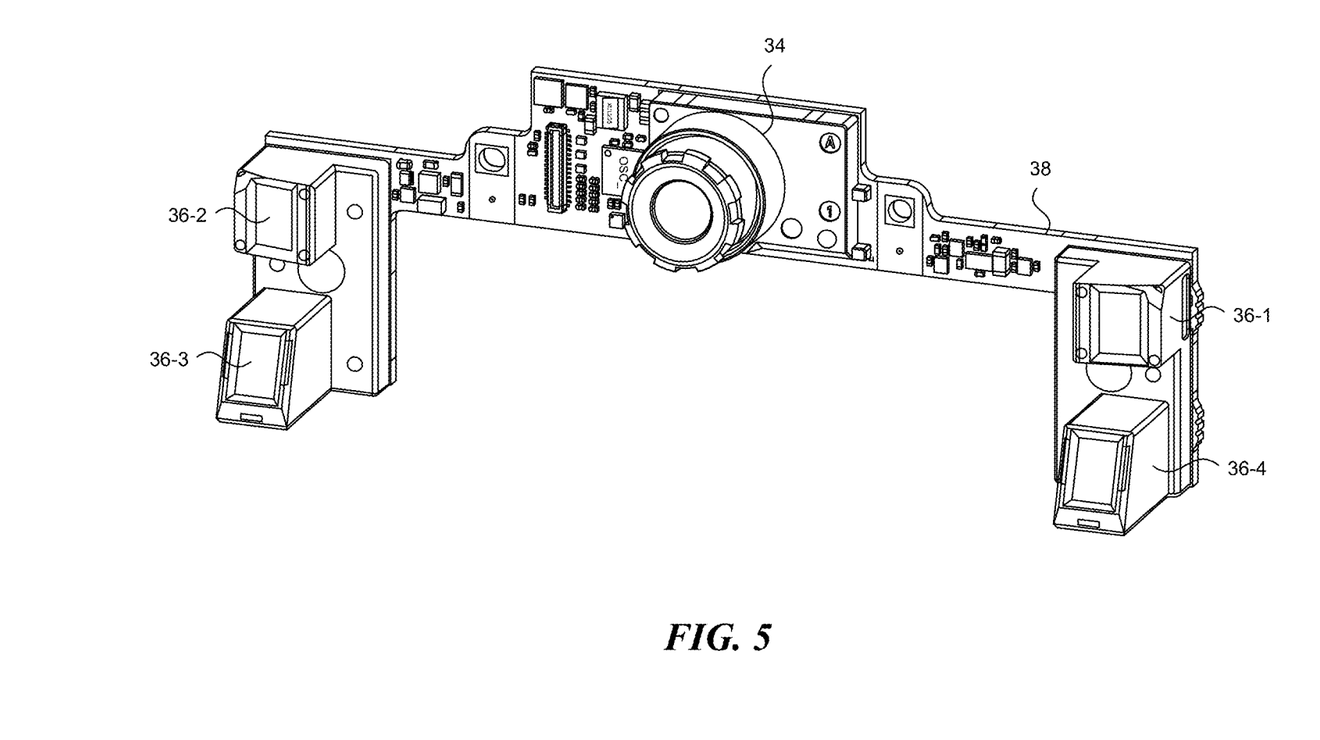
FIG. 5 shows a front view of a portion of a sensor assembly of an HMD device.

FIG. 5 shows a portion of the sensor assembly 32 of the HMD device 20, according to at least one embodiment. In particular, the sensor assembly 32 includes sensors and electronics mounted to a circuit board 38, which can be mounted to the chassis 24 as mentioned above. The sensors mounted to the circuit board 38 include the depth camera 34 and the illumination modules 36-1 through 36-4. Other sensors that may be included in the sensor assembly 32 but are not shown in the figures or discussed further may include head-tracking cameras, visible spectrum cameras, ambient light sensors, and the like. Some or all of these other sensors may also be mounted to the sensor assembly 32.

In the illustrated embodiment, illumination modules 36-1 and 36-2 are positioned such that they emit light in slightly outwardly divergent directions with respect to the depth camera 34; whereas illumination modules 36-3 and 36-4 are positioned such that they emit light directly forward (i.e., parallel to the user's head-pointing vector). Moreover, illumination from illumination modules 36-3 and 36-4 has a reduced field of illumination and increased range from the depth camera 34 that is greater than the range of illumination from illumination modules 36-1 and 36-2 from the depth camera 34. Hence, illumination modules 36 are collectively configured to illuminate the user's field of view, although the illumination may not be visible to the user. The locations and positions of the illumination modules 36 and the depth camera 34 relative to each other as shown in FIG. 5 are merely examples of a configuration used for depth sensing; other configurations are possible in the context of the technique introduced here.

In some embodiments, the illumination modules 36-1 and 36-2 provide the targeted illumination profile for hand tracking purpose. The illumination modules 36-1 and 36-2 can provide overlapping illumination on the hand(s) being tracked. In other words, each of the illumination modules 36-1 and 36-2 individually provides the targeted illumination profile. The combination of the illumination modules 36-1 and 36-2 provides the same illumination profile (with an illumination intensity twice as the illumination intensity for each single illumination module).

In contrast, the illumination modules 36-3 and 36-4 provide illumination for the spatial mapping of the environment in front of the device. In some embodiments, the handing tracking task and the environment spatial mapping task can be performed using a time division multiplexing mechanism. For certain frames (e.g., odd frames), the illumination modules 36-3 and 36-4 provide illumination for the environment and the depth camera collects imaging signals for spatial mapping of the environment. For other frames (e.g., even frames), the illumination modules 36-1 and 36-2 provide illumination for hand tracking and the depth camera collects imaging signals for hand tracking.

Illumination Profile Compensating Optical Loss

In some embodiments, the illumination profile is designed not only to match the interaction volume, but also to compensate for the optical losses in the depth camera system. For example, the tracking system including the imaging sensor and associated optical components may have a wide field of view (e.g., 120 degrees horizontally). Due to the wide field of view, there are optical losses caused by physical limitations of the optical components of the device. For example, due to the physical geometric limitations of the imaging sensor and optical components (e.g., lens), the illumination across the wide field of view may not be uniform. As a result, the image recorded is not uniformly illuminated.

The optical losses can be caused by various reasons. One type of optical loss is due to lens shading (also referred to as vignetting, or relative illumination losses). Optical components are usually designed for a optimal image sensing area. If the size of the imaging sensor is larger than the optimal image sensing area, the corners or edges of the image can appear darker than the center of the image.

The infrared pass filter and the visor (e.g., visor assembly 22 as illustrated in FIG. 4) can also cause optical losses. In addition, the pixel of the imaging sensor is designed to receive light signal within certain acceptance angle. The light signals outside of the acceptance angle are not recorded and hence contribute to the optical losses as well.

The illumination profile can be adjusted to compensate for those optical losses. Particularly, the optical losses often happen at the edges of the field of view. Thus, the illumination profile can be designed such that the illumination power is higher at a peripheral portion of the field of view. In some embodiments, the design of the illumination profile can depend on various factors. The factors include, e.g., relative illumination loss of the lens, loss (and angular dependence) of infrared band filter, illumination spectrum of the light source, operating temperature range of the light source, optical loss of the visor, interaction volume, etc.

Figure 6:
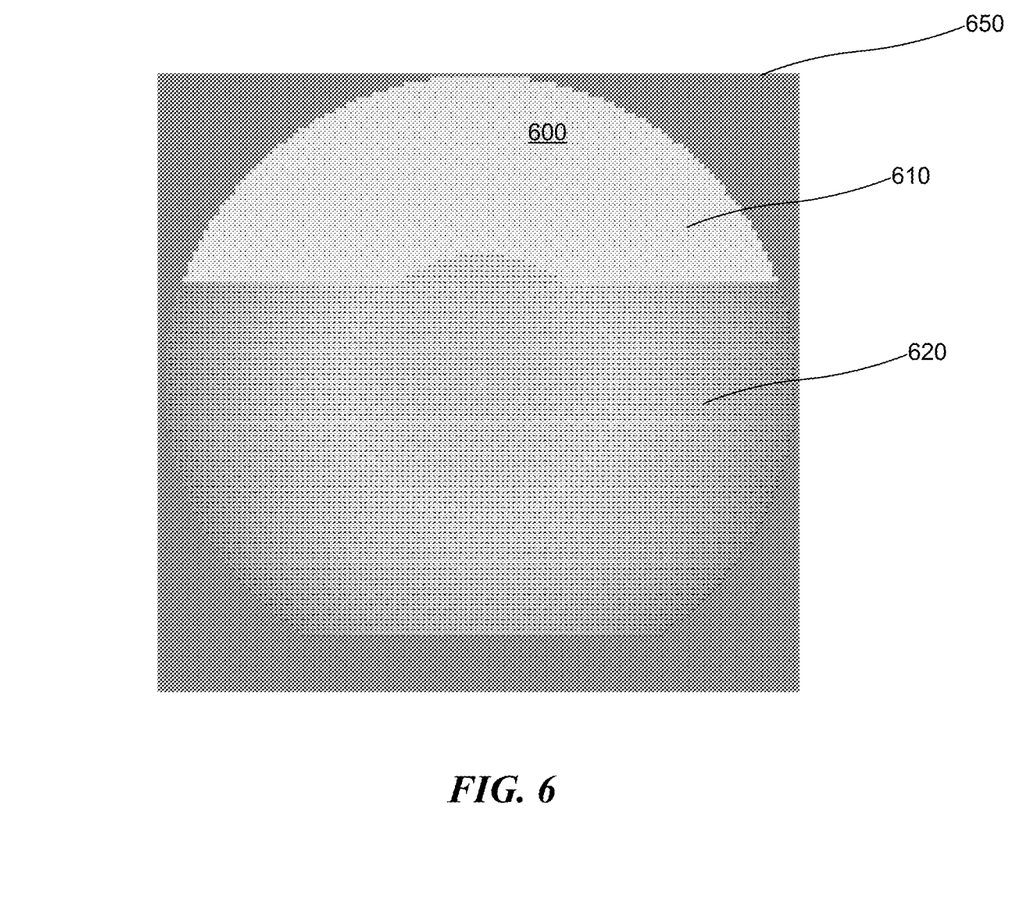
FIG. 6 shows an example of illumination profile that matches an interaction volume and compensates for optical losses.

FIG. 6 shows an example of illumination profile that matches an interaction volume and compensates for optical losses. The illumination profile 600 can have a radially symmetric shape (e.g., a substantially circular shape) with a field of view radius of 60 degrees, which generally matches the shape of human field of view. The slice at the bottom of the FOV is due to, e.g., mechanical clipping of the sensor field of illumination. The illumination profile 600 covers a major portion of the image sensing area 650 of the imaging sensor. In some embodiments, the pixel dimension of the imaging sensing area is, e.g., 500 pixels by 500 pixels (in other systems it can be 1000×1000 pixels or any pixel dimension. The illumination profile 600 covers, e.g., about 120 degrees of horizontal field of view. The illumination profile 600 includes an upper portion 610 and a lower portion 620.

The upper portion 610 has a relatively small area, which is consistent with the fact that an upper limit of the human vertical field of view is 18 degrees above the head-pointing vector (as illustrated in FIG. 10), and that the distance between the hand and the HMD is reduced when the hand is raised high. Because the user usually raise hands close to the head when the user interacts with the device (as indicated by the interaction volume 150), the upper portion 610 has relatively low illumination power. The low illumination power is enough to illuminate the hand being tracked (when the hands are raised above the head-pointing vector) and helps reducing power consumption.

The lower portion 620 has a relative large area, which is consistent with the fact that the lower limit of the human vertical field of view is 85 degrees below the head-pointing vector (as illustrated in FIG. 10). The illumination power at the center of the lower portion 620 is lower than the illumination power at a peripheral portion of the lower portion 620. This is due to at least two reasons. Firstly, the user typically places hands closer to the body when the hands reach out in front; and the user extends arms when the user put hands to the sides or down below the waist. Taking into account the lengths of the head and the neck, the distance between the hand and the HMD increases when the user moves a hand from a position in front of the body to another position at a side of the body or down below the waist. Thus, more illumination power is needed to track hands that are located at a peripheral portion of the field of view. Secondly, the optical losses typically occur at the edges of the field of view and therefore need illumination compensation. For example, when the hand is lower there is an additional Fresnel loss due to the visor. Anti-reflective (AR) coatings are not enough to achieve a good optical performance above 60 degrees.

The optimized illustration profile (as illustrated in FIG. 6) improves the performance of the depth camera system, which can be measured by depth signal jitter. The depth signal jitter is a measurement of the uncertainty of the characterized depth signal. This can be evaluated temporally over with multiple camera frames, or spatially by examining the signal deviation over a uniform region. In other words, the optimized illumination profile provides a uniform depth signal over the desired field of view of the system.

Figure 7:
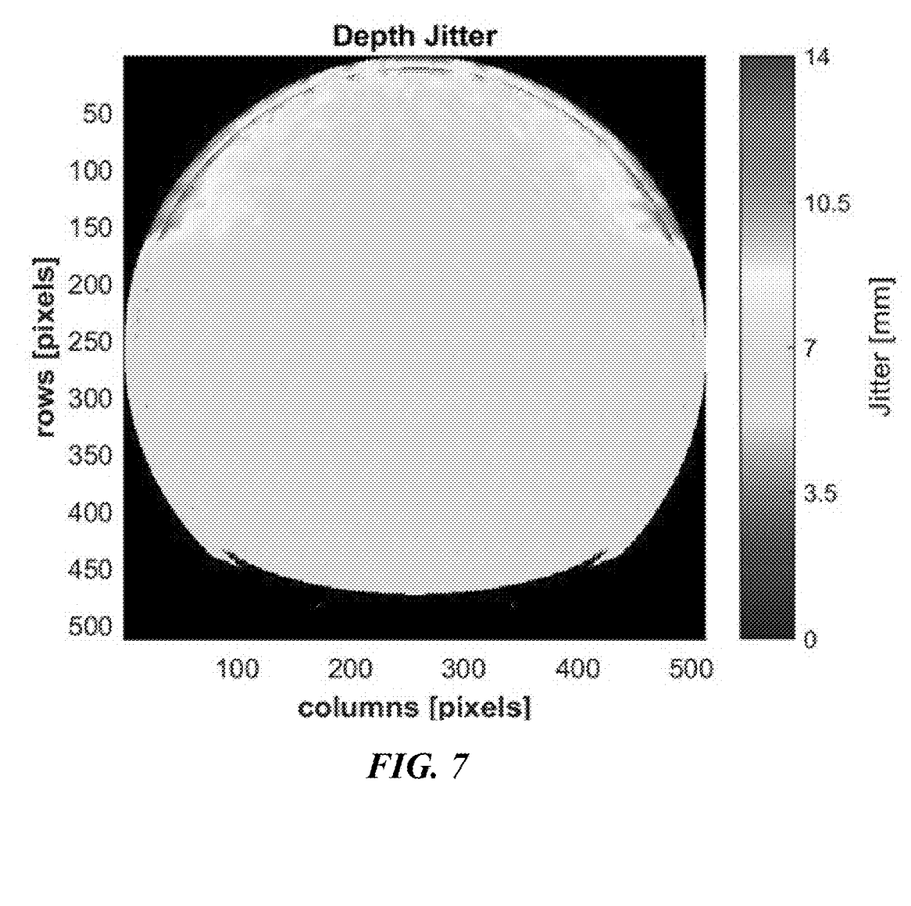
FIG. 7 shows a map of depth signal jitter for a depth camera system that uses the illumination profile illustrated in FIG. 6.

FIG. 7 shows a map of depth signal jitter for a uniform radial distance for a depth camera system that uses the illumination profile illustrated in FIG. 6. In the jitter map, the pixel rows from 200 to 450 correspond to the space from the shoulder height and below. The jitter for rows 200-450 is about 5-7, which indicates an optimized performance for the depth camera system. The pixel rows from 0 to 200 correspond to the space from the shoulder height and above. The jitter for rows 0-200 varies from 7 to 14 (at the edges). This is consistent with the reduced illumination power of the upper portion 610 of the illumination profile 600 (illustrated in FIG. 6) causing increased jitter values. The depth camera system performs better at the lower portion than the upper portion, as desired, matching the optical energy consumption with the regions where user interacts with the HMD.

Dynamic Illumination Power Adjustment

In some embodiments, the hand tracking device identifies locations of the user's hands using depth sensing technologies. The device can dynamically adjust the illumination power based on the current distance between the hands and the device. For example, the device can dynamically adjust the power intensity of the light source while maintaining the illumination profile. The illumination profile depends on the hardware design of the optical components of the illumination module(s) and does not change during operation. In some alternative embodiments, the device can instead adjust the illumination and exposure time for the imaging sensor.

When the hands move closer to the device, the device can reduce the power intensity of the light source. This is due to the fact that the received illumination at the sensor is proportional to $1/r^2$, where r is the radial distance between the camera and the hands. When the hands move away from the device, the device can increase the power intensity of the light source. As a result, the illumination on the hands can remain substantially constant when the user moves hands to interact with the device. The constant illumination leads to a constant signal to noise ratio, or a constant jitter performance of the depth signals as measured on the user's hand.

Figure 8:
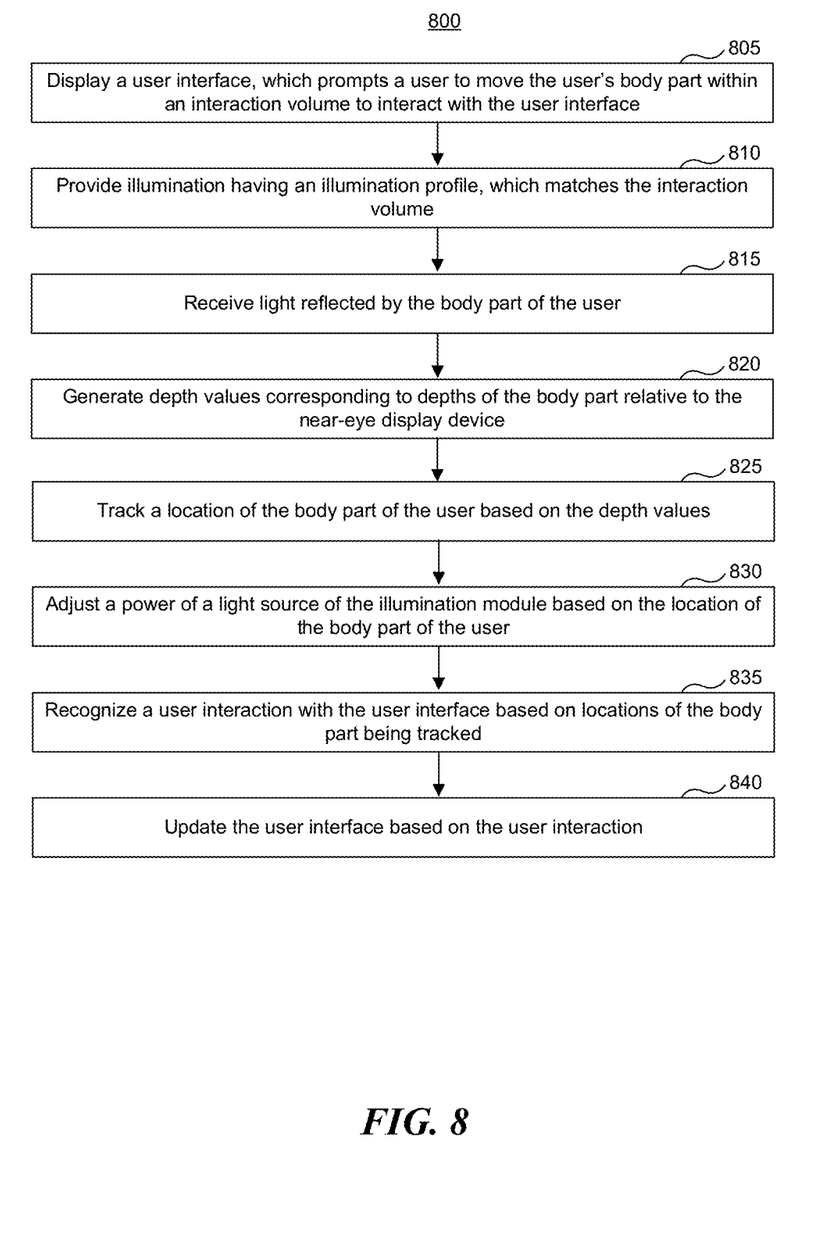
FIG. 8 illustrates a sample process of hand tracking based on an optimized illumination profile and a dynamic illumination power adjustment.

FIG. 8 illustrates a sample process of hand tracking based on an optimized illumination profile and a dynamic illumination power adjustment. At step 805 of the process 800, a near-eye display device displays a user interface. The user interface prompts a user to move the user's body part (e.g., hands) within an interaction volume to interact with the user interface.

At step 810, an illumination module of a near-eye display device provides illumination having an illumination profile, which matches the interaction volume based on human factors of a user. In some embodiments, the illumination profile includes an upper portion and a lower portion (as illustrated in FIG. 6). The upper portion of the illumination profile has an average illumination power lower than an average illumination power of the lower portion of the illumination profile. In other embodiments, the illumination power can be varied to directly match the optical losses and desired interaction volume of the system. At least a peripheral portion of the lower portion of the illumination profile has an illumination power that is higher than an illumination power of a center of the lower portion of the illumination profile. Such a design helps overcoming the optical losses of the system (e.g., lens shading). The illumination module can include an optical collimator and an optical diffuser that are designed to distribute light in directions according to the illumination profile. The illumination module can include a single mode laser and a diffractive optical element to achieve the desired illumination profile.

At step 815, an imaging sensor of the near-eye display device receives light reflected by the body part of the user. At step 820, the imaging sensor further generates depth values corresponding to depths of the body part relative to the near-eye display device. In some alternative embodiments, a processor (instead of the imaging sensor itself) can generate the depth values.

At step 825, a processor of the near-eye display device tracks a location of the body part of the user based on the depth values. At step 830, the near-eye display device dynamically adjusts a power of a light source of the illumination module based on the location of the body part of the user. As a result, the light source increases the brightness level when the body part moves away from the near-eye display device. At step 835, the near-eye display device recognizes a user interaction with the user interface based on locations of the body part being tracked. At step 840, the near-eye display device updates the user interface based on the user interaction.

Figure 9:
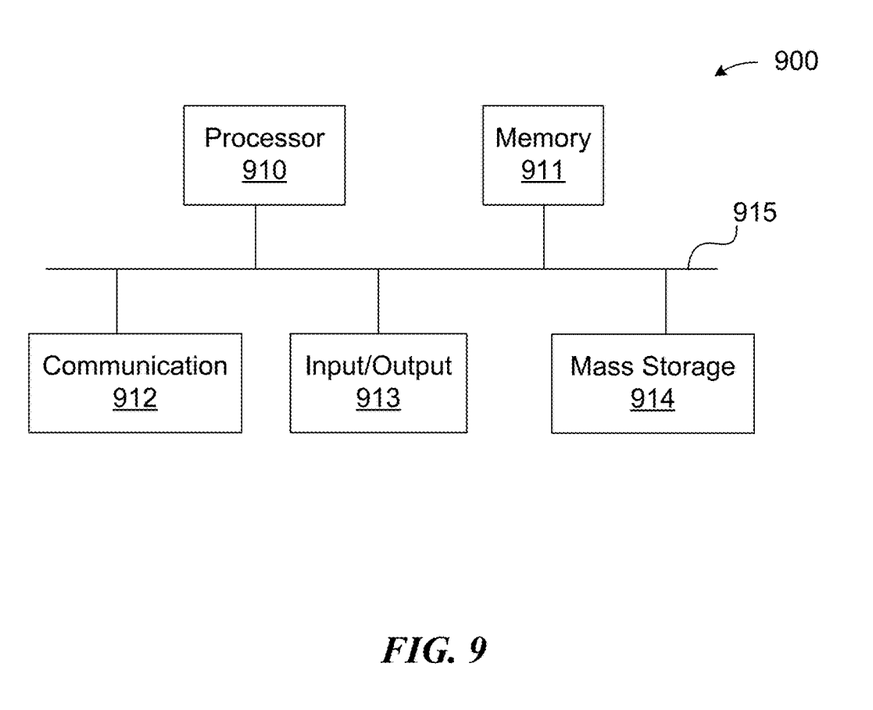
FIG. 9 shows a high-level example of a hardware architecture of a system that can be used to implement any one or more of the functional components described herein.

FIG. 9 shows a high-level example of a hardware architecture of a processing system that can be used to implement the disclosed functions. The processing system illustrated in FIG. 9 can be, e.g., a subsystem of the HMD device, the NED device or other hand tracking devices. One or multiple instances of an architecture such as shown in FIG. 9 (e.g., multiple computers) can be used to implement the techniques described herein, where multiple such instances can be coupled to each other via one or more networks.

The illustrated processing system 900 includes one or more processors 910, one or more memories 911, one or more communication device(s) 912, one or more input/output (I/O) devices 913, and one or more mass storage devices 914, all coupled to each other through an interconnect 915. The interconnect 915 may be or include one or more conductive traces, buses, point-to-point connections, controllers, adapters and/or other conventional connection devices. Each processor 910 controls, at least in part, the overall operation of the processing device 900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 911 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 914 can be or include one or more hard drives, digital versatile disks (DVDs), flash memories, or the like. Each memory 911 and/or mass storage 914 can store (individually or collectively) data and instructions that configure the processor(s) 910 to execute operations to implement the techniques described above. Each communication device 912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 900, each I/O device 913 can be or include a device such as a display (which may be a touch screen display), audio speaker, keyboard, mouse or other pointing device, microphone, camera, etc. Note, however, that such I/O devices may be unnecessary if the processing device 900 is embodied solely as a server computer.

In the case of a user device, a communication device 912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 912 can be or include, for example, any of the aforementioned types of communication devices, a wired Ethernet adapter, cable modem, DSL modem, or the like, or a combination of such devices.

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

EXAMPLES OF CERTAIN EMBODIMENTS

Certain embodiments of the technology introduced herein are summarized in the following numbered examples:

1. A near-eye display device including: an illumination module that, when in operation, provides illumination having an illumination profile that matches a predicted interaction volume within which a user of the near-eye display device is expected to place a body part of the user to interact with a user interface of the near-eye display device; an imaging sensor that, when in operation, receives light reflected by an environment of the near-eye display device and the body part of the user and generates depth values corresponding to depths of the environment and the body part relative to the near-eye display device; and a processor that, when in operation, tracks a location of the body part of the user based on the depth values.

2. The near-eye display device of example 1, wherein the illumination profile includes an upper portion and a lower portion, the upper portion corresponding to a first part of the predicted interaction volume from a shoulder height of the user and above, the lower portion corresponding to a second part of the predicted interaction volume from the shoulder height of the user and below, and wherein the upper portion of the illumination profile has an average illumination power that is lower than an average illumination power of the lower portion of the illumination profile.

3. The near-eye display device of example 2, wherein the illumination module is designed such that a peripheral portion of the lower portion of the illumination profile has an illumination power that is higher than an illumination power of a center of the lower portion of the illumination profile.

4. The near-eye display device in any of the preceding examples 1 through 3, wherein at least a peripheral portion of the illumination profile has an illumination power that is higher than an illumination power of a center of the illumination profile and compensates optical losses of optical components of the near-eye display device.

5. The near-eye display device in any of the preceding examples 1 through 4, wherein the illumination module includes: a light source that emits light; and an optical diffuser that distributes the light according to the illumination profile.

6. The near-eye display device in any of the preceding examples 1 through 5, wherein the illumination module provides illumination to the predicted interaction volume; and wherein the near-eye display device further includes: a second illumination module that provides illumination to the environment.

7. The near-eye display device of example 6, wherein the imaging sensor uses a time division multiplexing mechanism based on frames that are divided into a first plurality of frames and a second plurality of frames, wherein at the first plurality of frames the imaging sensor receives light that is emitted by said illumination module and reflected by the body part, and wherein at the second plurality of frames the imaging sensor receives light that is emitting by the second illumination module and reflected by the environment.

8. The near-eye display device in any of the preceding examples 1 through 7, wherein the illumination profile causes a jitter performance of the depth values corresponding to points from a shoulder height of the user and below to be better than a jitter performance of the depth values corresponding to points from the shoulder height of the user and above.

9. The near-eye display device in any of the preceding examples 1 through 8, wherein the processor determines an adjustment of an illumination intensity of the illumination module based on the location of the body part of the user.

10. A near-eye apparatus of body part tracking, including: means for providing illumination having an illumination profile that matches a predicted interaction volume; means for receiving light reflected by a body part of the user; means for generating depth values corresponding to depths of the body part relative to the near-eye display device; and means for tracking a location of the body part of the user based on the depth values.

11. The near-eye apparatus of example 10, further including: means for displaying a user interface by the near-eye display device, wherein the user moves the body part of the user within the predicted interaction volume to interact with the user interface.

12. The near-eye apparatus of example 10 or 11, further including: means for adjusting a power of a light source of a illumination module based on the location of the body part of the user.

13. The near-eye apparatus in any of the preceding examples 10 through 12, further including: means for recognizing a user interaction with the user interface based on locations of the body part being tracked; and means for updating the user interface based on the user interaction.

14. The near-eye apparatus in any of the preceding examples 10 through 13, wherein the illumination profile includes an upper portion and a lower portion, the upper portion of the illumination profile has an average illumination power that is lower than an average illumination power of the lower portion of the illumination profile, and a peripheral portion of the lower portion of the illumination profile has an illumination power that is higher than an illumination power of a center of the lower portion of the illumination profile.

15. The near-eye apparatus in any of the preceding examples 10 through 14, wherein the illumination module includes an optical collimator and an optical diffuser that are designed to distribute light in directions according to the illumination profile.

16. A near-eye display device including: an illumination module that, when in operation, provides illumination having an illumination profile that matches a predicted interaction volume and that compensates for optical losses of optical components of the near-eye display device; an imaging sensor that, when in operation, receives light reflected by a body part of a user and generates depth values corresponding to depths of the body part relative to the near-eye display device; and a processor that, when in operation, tracks a location of the body part of the user based on the depth values and determines an adjustment of an illumination intensity of the illumination module based on the location of the body part of the user.

17. The near-eye display device of example 16, wherein the predicted interaction volume defines a space within which the user of the near-eye display device is expected to place the body part of the user to interact with a user interface of the near-eye display device.

18. The near-eye display device of example 16 or 17, wherein at least some of the optical losses are caused by lens shading, an infrared pass filter, a visor, or an acceptance angle of pixels of the imaging sensor.

19. The near-eye display device in any of the preceding examples 16 through 18, wherein the illumination module has a field of illumination that is smaller than a field of view of the imaging sensor.

20. The near-eye display device in any of the preceding examples 16 through 19, wherein a peripheral portion of the lower portion of the illumination profile has an illumination power that is higher than an illumination power of a center of the lower portion of the illumination profile.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A near-eye display device comprising:
an illumination module that, when in operation, provides illumination having an illumination profile that matches a predicted interaction volume within which a user of the near-eye display device is expected to place a body part of the user to interact with a user interface of the near-eye display device, wherein the illumination profile includes an upper portion and a lower portion, the upper portion corresponding to a first part of the predicted interaction volume from a shoulder height of the user and above, the lower portion corresponding to a second part of the predicted interaction volume from the shoulder height of the user and below, and wherein the upper portion of the illumination profile has an average illumination power that is lower than an average illumination power of the lower portion of the illumination profile;
an imaging sensor that, when in operation, receives light reflected by an environment of the near-eye display device and the body part of the user and generates depth values corresponding to depths of the environment and the body part relative to the near-eye display device; and
a processor that, when in operation, tracks a location of the body part of the user based on the depth values.

2. The near-eye display device of claim 1, wherein the illumination module is designed such that a peripheral portion of the lower portion of the illumination profile has an illumination power that is higher than an illumination power of a center of the lower portion of the illumination profile.

3. The near-eye display device of claim 1, wherein at least a peripheral portion of the illumination profile has an illumination power that is higher than an illumination power of a center of the illumination profile and compensates optical losses of optical components of the near-eye display device.

4. The near-eye display device of claim 1, wherein the illumination module includes:
a light source that emits light; and
an optical diffuser that distributes the light according to the illumination profile.

5. The near-eye display device of claim 1, wherein the illumination module provides illumination to the predicted interaction volume; and wherein the near-eye display device further comprises:
a second illumination module that provides illumination to the environment.

6. The near-eye display device of claim 5, wherein the imaging sensor uses a time division multiplexing mechanism based on frames that are divided into a first plurality of frames and a second plurality of frames, wherein at the first plurality of frames the imaging sensor receives light that is emitted by said illumination module and reflected by the body part, and wherein at the second plurality of frames the imaging sensor receives light that is emitting by the second illumination module and reflected by the environment.

7. The near-eye display device of claim 1, wherein the illumination profile causes a jitter performance of the depth values corresponding to points from a shoulder height of the user and below to be better than a jitter performance of the depth values corresponding to points from the shoulder height of the user and above.

8. The near-eye display device of claim 1, wherein the processor determines an adjustment of an illumination intensity of the illumination module based on the location of the body part of the user.

9. A method of body part tracking, comprising:
providing, by an illumination module of a near-eye display device, illumination having an illumination profile that matches a predicted interaction volume, wherein the illumination profile includes an upper portion and a lower portion, the upper portion of the illumination profile has an average illumination power that is lower than an average illumination power of the lower portion of the illumination profile, and a peripheral portion of the lower portion of the illumination profile has an illumination power that is higher than an illumination power of a center of the lower portion of the illumination profile;
receiving, by an imaging sensor of the near-eye display device, light reflected by a body part of the user;
generating depth values corresponding to depths of the body part relative to the near-eye display device; and
tracking a location of the body part of the user based on the depth values.

10. The method of claim 9, further comprising:
displaying a user interface by the near-eye display device, wherein the user moves the body part of the user within the predicted interaction volume to interact with the user interface.

11. The method of claim 9, further comprising:
adjusting a power of a light source of the illumination module based on the location of the body part of the user.

12. The method of claim 9, further comprising:
recognizing a user interaction with the user interface based on locations of the body part being tracked; and
updating the user interface based on the user interaction.

13. The method of claim 9, wherein the illumination module includes an optical collimator and an optical diffuser that are designed to distribute light in directions according to the illumination profile.

14. A near-eye display device comprising:
an illumination module that, when in operation, provides illumination having an illumination profile that matches a predicted interaction volume and that compensates for optical losses of optical components of the near-eye display device, wherein a peripheral portion of the lower portion of the illumination profile has an illumination power that is higher than an illumination power of a center of the lower portion of the illumination profile;
an imaging sensor that, when in operation, receives light reflected by a body part of a user and generates depth values corresponding to depths of the body part relative to the near-eye display device; and
a processor that, when in operation, tracks a location of the body part of the user based on the depth values and determines an adjustment of an illumination intensity of the illumination module based on the location of the body part of the user.

15. The near-eye display device of claim 14, wherein the predicted interaction volume defines a space within which the user of the near-eye display device is expected to place the body part of the user to interact with a user interface of the near-eye display device.

16. The near-eye display device of claim 14, wherein at least some of the optical losses are caused by lens shading, an infrared pass filter, a visor, or an acceptance angle of pixels of the imaging sensor.

17. The near-eye display device of claim 14, wherein the illumination module has a field of illumination that is smaller than a field of view of the imaging sensor.

* * * * *